United States Patent
Nemoto et al.

(10) Patent No.: US 11,388,414 B2
(45) Date of Patent: Jul. 12, 2022

(54) DEVICE AND METHOD FOR ALLOCATING CODE AMOUNTS TO INTRA PREDICTION MODES

(71) Applicant: NIPPON HOSO KYOKAI, Tokyo (JP)

(72) Inventors: Shimpei Nemoto, Tokyo (JP); Shunsuke Iwamura, Tokyo (JP); Atsuro Ichigaya, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 17/036,931

(22) Filed: Sep. 29, 2020

(65) Prior Publication Data

US 2021/0014501 A1  Jan. 14, 2021

Related U.S. Application Data

(63) Continuation of application No. PCT/JP2019/014365, filed on Mar. 29, 2019.

(30) Foreign Application Priority Data

Mar. 30, 2018 (JP) .............................. JP2018-066711

(51) Int. Cl.
*H04N 19/146* (2014.01)
*H04N 19/105* (2014.01)
(Continued)

(52) U.S. Cl.
CPC ......... *H04N 19/146* (2014.11); *H04N 19/105* (2014.11); *H04N 19/11* (2014.11);
(Continued)

(58) Field of Classification Search
CPC .... H04N 19/105; H04N 19/11; H04N 19/119; H04N 19/13; H04N 19/14; H04N 19/146;
(Continued)

(56) References Cited

U.S. PATENT DOCUMENTS 10,721,468 B2   7/2020 Shibata
2009/0268974 A1* 10/2009 Takagi ............... H04N 19/14
                                                      382/238
(Continued)

FOREIGN PATENT DOCUMENTS

JP   2012-160991 A    8/2012
JP   2017-228827 A   12/2017
(Continued)

OTHER PUBLICATIONS

International Telecommunication Union; "High Efficiency Video Coding"; Rec. H.265; Nov. 2019; pp. 1-712.
(Continued)

*Primary Examiner* — Francis Geroleo
(74) *Attorney, Agent, or Firm* — Studebaker & Brackett PC (57) ABSTRACT

An image encoding device (1) according to a first feature encodes blocks obtained by dividing an original image of a frame included in a video. The image encoding device (1) includes a code amount allocator (180) configured to allocate a code amount to each of a plurality of intra prediction modes defined in advance, a mode selector (171) configured to select an intra prediction mode to be applied to a target block of intra prediction from among the plurality of intra prediction modes, and an encoder (130) configured to encode identification information indicating the selected intra prediction mode in accordance with the allocated code amount. The code amount allocator (180) calculates a feature amount of a plurality of reference pixels adjacent to the target block and changes a manner of allocation of code amounts to the plurality of intra prediction modes based on the calculated feature amount.

3 Claims, 6 Drawing Sheets

(51) Int. Cl.
*H04N 19/11* (2014.01)
*H04N 19/119* (2014.01)
*H04N 19/159* (2014.01)
*H04N 19/176* (2014.01)
*H04N 19/13* (2014.01)
*H04N 19/46* (2014.01)
*H04N 19/593* (2014.01)

(52) U.S. Cl.
CPC ........... *H04N 19/119* (2014.11); *H04N 19/13* (2014.11); *H04N 19/159* (2014.11); *H04N 19/176* (2014.11); *H04N 19/46* (2014.11); *H04N 19/593* (2014.11)

(58) Field of Classification Search
CPC .. H04N 19/159; H04N 19/176; H04N 19/593; H04N 19/70
See application file for complete search history.

(56) References Cited

U.S. PATENT DOCUMENTS

| | | | |
|---|---|---|---|
| 2012/0044993 A1 | 2/2012 | Sato | |
| 2013/0230104 A1* | 9/2013 | Song | H04N 19/14 375/240.12 |
| 2014/0376626 A1* | 12/2014 | Lee | H04N 19/91 375/240.12 |
| 2020/0396483 A1* | 12/2020 | Heo | H04N 19/70 |

FOREIGN PATENT DOCUMENTS

| | | |
|---|---|---|
| WO | 2010/101063 A1 | 9/2010 |
| WO | 2018/047952 A1 | 3/2018 |

OTHER PUBLICATIONS

Jianle Chen et al.; "Algorithm Description of Joint Exploration Test Model 7 (JEM 7)"; Joint Video Exploration Team (JVET) of ITU-T; SG 16 WP 3 and ISO/IEC JTC 1/SC 29/WG 11 7th Meeting; Jul. 13-21, 2017; pp. 7-8; Torino, Italy.
International Search Report issued in PCT/JP2019/014365; dated Jun. 18, 2019.

\* cited by examiner

| LA | A1 | A2 | A3 | A4 | A5 | A6 | A7 | A8 |
|----|----|----|----|----|----|----|----|----|
| L1 | | | | | | | | |
| L2 | | | | | | | | |
| L3 | | | TARGET BLOCK | | | | | |
| L4 | | | | | | | | |
| L5 | | | | | | | | |
| L6 | | | | | | | | |
| L7 | | | | | | | | |
| L8 | | | | | | | | |

DEVICE AND METHOD FOR ALLOCATING CODE AMOUNTS TO INTRA PREDICTION MODES

TECHNICAL FIELD

The present invention relates to an image encoding device, an image decoding device, and a program.

BACKGROUND ART

Recently, use of ultra-high-definition video such as 8K-SHV has been increasingly spreading in video encoding technology, and encoding schemes such as AVC/H.264 and HEVC/H.265 have been known as methods of transmitting a vast amount of video data.

In such an encoding scheme, intra prediction using spatial correlation in a frame is used (for example, Non-Patent Literature 1). In the intra prediction, a prediction image is generated by using decoded reference pixels adjacent to a prediction target block (hereinafter referred to as a "target block"). In HEVC disclosed in Non-Patent Literature 1, an optimum mode is selected on an image encoding device side from among 35 intra prediction modes including a planar prediction, a DC prediction, and a plurality of directional predictions, and identification information indicating the selected mode is transmitted to an image decoding device side.

In addition, in HEVC, three most probable modes (MPM) are generated from intra prediction modes applied to peripheral blocks of the target block. When any one of the three most probable modes is applied to the target block, identification information indicating the applied most probable mode is encoded to reduce the code amount of identification information of the intra prediction mode.

In performance evaluation software (Joint Exploration Model (JEM)) of future image encoding, 67 intra prediction modes are introduced as extension of HEVC, which enables more precise intra prediction.

CITATION LIST

Non-Patent Literature

Non-Patent Literature 1: Recommendation ITU-T H.265, (December 2016), "High efficiency video coding", International Telecommunication Union

SUMMARY OF INVENTION

When an intra prediction mode to be applied to a target block is selected, it is typical to generate a prediction image by using reference pixels for each of a plurality of intra prediction modes defined in advance, evaluate the prediction image, and select an intra prediction mode with which a most favorable prediction image is obtained. Thus, the selected intra prediction mode is correlated with the reference pixels used to generate the prediction image.

However, at reduction of the code amount of identification information of intra prediction modes, the method disclosed in Non-Patent Literature 1 considers intra prediction modes applied to peripheral blocks of a target block but does not consider reference pixels used to generate a prediction image, and thus has room for improvement in the efficiency of reducing the code amount of identification information of intra prediction modes.

In particular, since the number of intra prediction modes is increased to 67 in the future image encoding, it is desired to efficiently reduce the code amount of identification information of intra prediction modes.

Thus, the present invention is intended to provide an image encoding device, an image decoding device, and a program that can efficiently reduce the code amount of identification information of intra prediction modes.

An image encoding device according to a first feature encodes blocks obtained by dividing an original image of a frame included in a video. The image encoding device includes a code amount allocator configured to allocate a code amount to each of a plurality of intra prediction modes defined in advance, a mode selector configured to select an intra prediction mode to be applied to a target block of intra prediction from among the plurality of intra prediction modes, and an encoder configured to encode identification information indicating the selected intra prediction mode in accordance with the allocated code amount. The code amount allocator includes a feature amount calculator configured to calculate a feature amount of a plurality of reference pixels adjacent to the target block, and an allocation changer configured to change a manner of allocation of code amounts to the plurality of intra prediction modes based on the calculated feature amount.

An image decoding device according to a second feature decodes blocks obtained by dividing an image of a frame included in a video. The image decoding device includes a decoder configured to acquire identification information of an intra prediction mode by decoding encoded data generated by an image encoding device, a code amount allocator configured to allocate a code amount to each of a plurality of intra prediction modes defined in advance, and a mode specifier configured to specify an intra prediction mode to be applied to a target block of intra prediction based on the decoded identification information and the allocated code amount. The code amount allocator includes a feature amount calculator configured to calculate a feature amount of a plurality of reference pixels adjacent to the target block, and an allocation changer configured to change a manner of allocation of code amounts to the plurality of intra prediction modes based on the calculated feature amount.

A program according to a third feature causes a computer to function as the image encoding device according to the first feature.

A computer program according to a fourth feature causes a computer to function as the image decoding device according to the second feature.

According to the present invention, it is possible to provide an image encoding device, an image decoding device, and a program that can efficiently reduce the code amount of identification information of intra prediction modes.

DESCRIPTION OF EMBODIMENTS

The following describes an image encoding device and an image decoding device according to an embodiment with reference to the accompanying drawings. The image encoding device and the image decoding device according to the embodiment perform encoding and decoding of a video such as MPEG. In the following description of the drawings, parts identical or similar to each other are denoted by reference signs identical or similar to each other.

1. Configuration of Image Encoding Device

Figure 1:
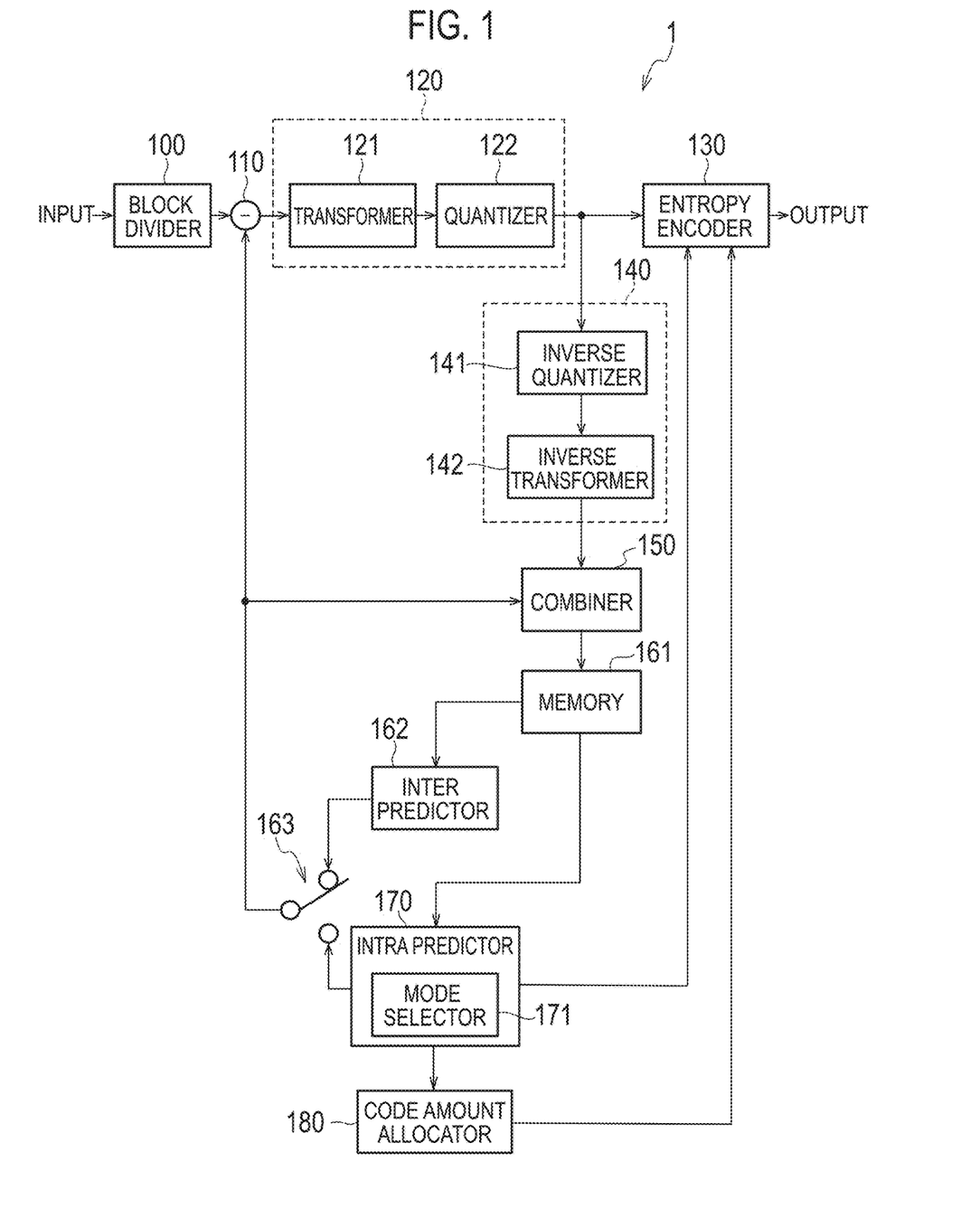
FIG. 1 is a diagram illustrating the configuration of an image encoding device according to an embodiment.

FIG. 1 is a diagram illustrating the configuration of an image encoding device 1 according to the present embodiment. As illustrated in FIG. 1, the image encoding device 1 includes a block divider 100, a subtractor 110, a transformer 121, a quantizer 122, an entropy encoder (encoder) 130, an inverse quantizer 141, an inverse transformer 142, a combiner 150, a memory 161, an inter predictor 162, an intra predictor 170, a switcher 163, and a code amount allocator 180.

The block divider 100 divides an input image of a frame (or picture) included in a video into blocks of small areas and outputs each block acquired through the division to the subtractor 110. The size of the block is, for example, 32×32 pixels, 16×16 pixels, 8×8 pixels, or 4×4 pixels. The shape of the block is not limited to square but may be rectangular. The block is the unit of encoding by the image encoding device 1 and the unit of decoding by an image decoding device 2 and is also referred to as a coding unit (CU).

The subtractor 110 calculates a prediction residual indicating the difference in the unit of pixel between the block input from the block divider 100 and a prediction image (prediction block) corresponding to the block. Specifically, the subtractor 110 calculates the prediction residual by subtracting each pixel value of the prediction image from the corresponding pixel value of the block and outputs the calculated prediction residual to the transformer 121. The prediction image is input to the subtractor 110 from the switcher 163 to be described later.

The transformer 121 and the quantizer 122 serve as a transformer/quantizer 120 configured to perform orthogonal transform processing and quantization processing in the unit of block.

The transformer 121 calculates transform coefficients by performing an orthogonal transform of the prediction residual input from the subtractor 110 and outputs the calculated transform coefficients to the quantizer 122. The orthogonal transform includes, for example, discrete cosine transform (DCT), discrete sine transform (DST), and Karhunen-Loeve transform (KLT).

The quantizer 122 generates quantized transform coefficients by performing quantization of the transform coefficients input from the transformer 121 by using a quantization parameter (Qp) and a quantization matrix. The quantization parameter (Qp) is a common parameter applied to the transform coefficients in the block and determines the roughness of the quantization. The quantization matrix has, as elements, quantization values of the respective transform coefficients through the quantization. The quantizer 122 outputs, for example, quantization control information and information of the generated quantized transform coefficients to an entropy encoder 130 and the inverse quantizer 141.

The entropy encoder 130 generates encoded data (bit stream) through data compression by performing entropy encoding of the quantized transform coefficients input from the quantizer 122 and outputs the encoded data to the outside of the image encoding device 1. The entropy encoding may employ Huffman coding, context-based adaptive binary arithmetic coding (CABAC), or the like. The entropy encoder 130 receives information related to prediction from the intra predictor 170 and the inter predictor 162. The entropy encoder 130 performs the entropy encoding also on this information.

The inverse quantizer 141 and the inverse transformer 142 serve as an inverse quantizer/inverse transformer 140 configured to perform inverse quantization processing and orthogonal transform processing in the unit of block.

The inverse quantizer 141 performs inverse quantization processing corresponding to the quantization processing performed by the quantizer 122. Specifically, the inverse quantizer 141 restores the transform coefficients by performing inverse quantization of the quantized transform coefficients input from the quantizer 122 by using the quantization parameter (Qp) and the quantization matrix and outputs the restored transform coefficients to the inverse transformer 142.

The inverse transformer 142 performs inverse orthogonal transform processing corresponding to the orthogonal transform processing performed by the transformer 121. For example, the inverse transformer 142 performs an inverse discrete cosine transform when the transformer 121 has performed discrete cosine transform. The inverse transformer 142 restores the prediction residual by performing an inverse orthogonal transform of the transform coefficients input from the inverse quantizer 141 and outputs the restored prediction residual to the combiner 150.

The combiner 150 combines the restored prediction residual input from the inverse transformer 142 with the prediction image input from the switcher 163 in the unit of pixel. The combiner 150 reconstructs (decodes) the block by adding each pixel value of the restored prediction residual and the corresponding pixel value of the prediction image and outputs a reconstruction block that is the reconstructed block to the memory 161. The reconstruction block is also referred to as a decoded block.

The memory 161 stores the reconstruction block input from the combiner 150. The memory 161 stores the reconstruction block in the unit of frame.

The inter predictor 162 performs inter prediction that predicts a prediction target block by using, as a reference image, a reconstruction image (decoding image) stored in the unit of frame in the memory 161. Specifically, the inter predictor 162 calculates a motion vector by a method such as block matching and generates an inter-predicted image based on the motion vector. The inter predictor 162 selects an optimum inter prediction method from among inter prediction (typically, bi-prediction) using a plurality of reference images and inter prediction (unilateral prediction) using one reference image and performs the inter prediction by using the selected inter prediction method. The inter predictor 162 outputs the generated inter-predicted image to the switcher 163 and outputs information related to the selected inter prediction method and the motion vector to the entropy encoder 130.

The intra predictor 170 generates an intra-predicted image with reference to decoded reference pixels adjacent to the prediction target block among the reconstruction blocks (decoded blocks) stored in the memory 161. The intra predictor 170 includes a mode selector 171 configured to select an optimum intra prediction mode to be applied to the target block from among a plurality of intra prediction modes defined in advance, and performs intra prediction by using the selected intra prediction mode.

The mode selector 171 generates a prediction image of the target block by using the reference pixels for each intra prediction mode defined in advance, evaluates the prediction image, and selects an intra prediction mode with which a most favorable prediction image is obtained. For example, the mode selector 171 selects the optimum intra prediction mode based on rate distortion (RD) cost. The intra predictor 170 outputs the intra-predicted image to the switcher 163 and outputs the mode number of the selected intra prediction mode to the entropy encoder 130. The mode number of the intra prediction mode selected by the mode selector 171 is not directly transmitted to the image decoding device 2, but identification information corresponding to the mode number is encoded by the entropy encoder 130, and the encoded identification information is transmitted to the image decoding device 2.

Figure 2:
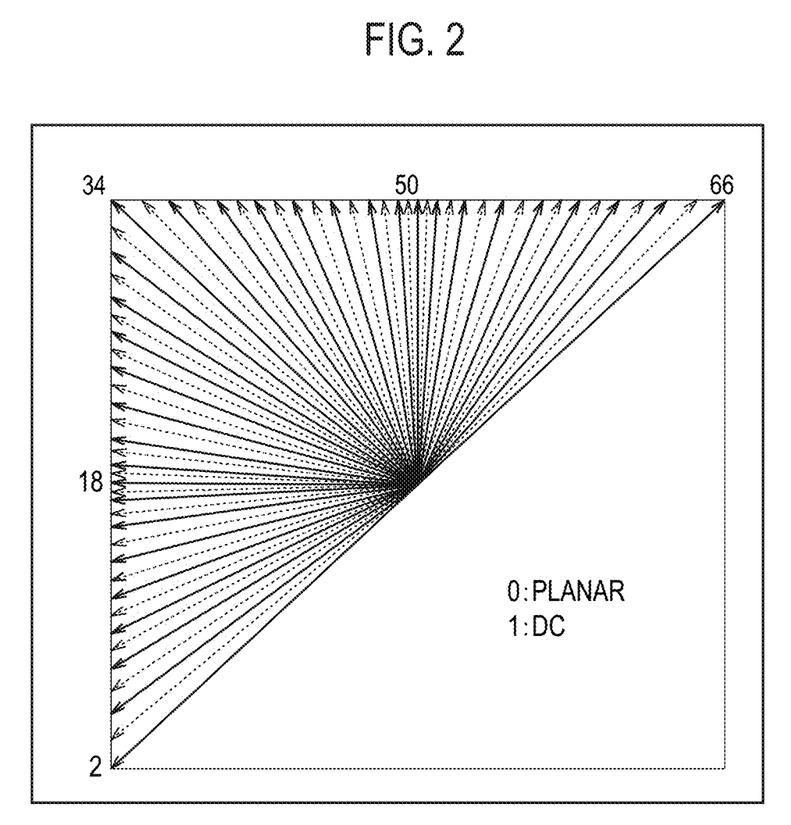
FIG. 2 is a diagram illustrating an intra prediction mode according to the embodiment.

FIG. 2 is a diagram illustrating a plurality of intra prediction modes according to the present embodiment. As illustrated in FIG. 2, 67 intra prediction modes of the mode numbers 0 to 66 are defined. The mode number "0" of intra prediction mode indicates a planar prediction, the mode number "1" of intra prediction mode indicates a DC prediction, and the mode numbers "2" to "66" of intra prediction mode indicate directional predictions. The mode number of an intra prediction mode is a number unique to the intra prediction mode and is a fixed number defined in advance. In each directional prediction, the direction of an arrow indicates the prediction direction, the starting point of the arrow indicates the position of a prediction target pixel, and the end point of the arrow indicates the position of a reference pixel used for prediction of the prediction target pixel. The mode numbers "2" to "33" indicate intra prediction modes in which reference pixels on the left side of the target block of intra prediction are mainly referred to. The mode numbers "35" to "66" indicate intra prediction modes in which reference pixels on the upper side of the target block of intra prediction are mainly referred to.

The switcher 163 performs switching between the intra-predicted image input from the intra predictor 170 and the inter-predicted image input from the inter predictor 162 and outputs one of the prediction images to the subtractor 110 and the combiner 150.

The code amount allocator 180 allocates a code amount to each intra prediction mode defined in advance. In addition, the code amount allocator 180 calculates feature amounts of a plurality of reference pixels adjacent to the target block of intra prediction and changes the manner of allocation of code amounts to the plurality of intra prediction modes defined in advance based on the calculated feature amounts. Each reference pixel is part of a decoded block and thus is information that is identical on the image encoding device 1 side and the image decoding device 2 side. Details of the code amount allocator 180 will be described later.

The entropy encoder 130 encodes, in accordance with the code amount allocated by the code amount allocator 180, the identification information indicating the intra prediction mode selected by the intra predictor 170 (mode selector 171). Specifically, the entropy encoder 130 encodes the identification information corresponding to the mode number of the intra prediction mode selected by the mode selector 171 and adds the encoded identification information to the encoded data.

2. Configuration of Image Decoding Device

Figure 3:
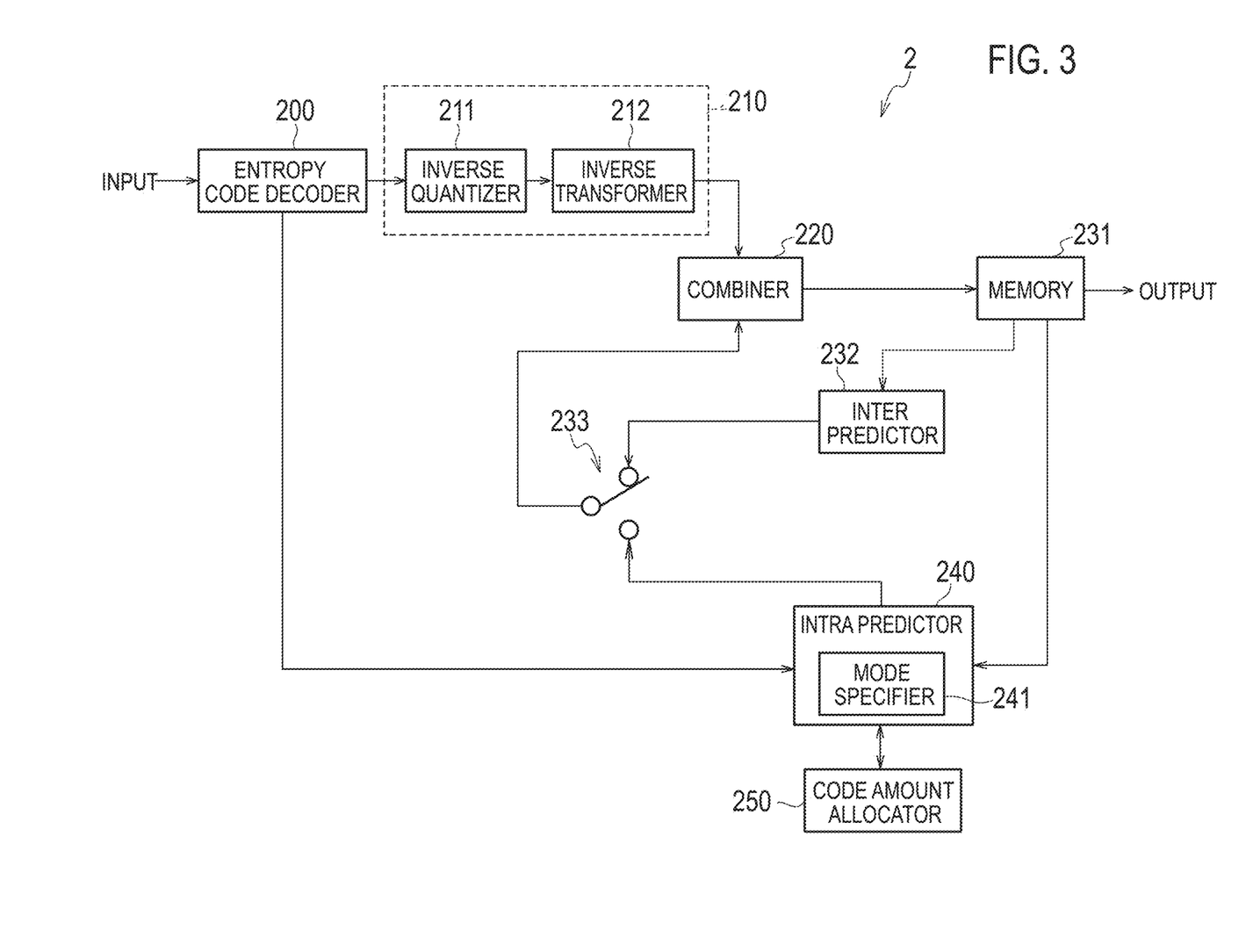
FIG. 3 is a diagram illustrating the configuration of an image decoding device according to the embodiment.

FIG. 3 is a diagram illustrating the configuration of the image decoding device 2 according to the present embodiment. As illustrated in FIG. 3, the image decoding device 2 includes an entropy code decoder (decoder) 200, an inverse quantizer 211, an inverse transformer 212, a combiner 220, a memory 231, an inter predictor 232, an intra predictor 240, a switcher 233, and a code amount allocator 250.

The entropy code decoder 200 decodes the encoded data generated by the image encoding device 1 and outputs the quantized transform coefficients to the inverse quantizer 211. In addition, the entropy code decoder 200 decodes the encoded data, acquires information related to prediction (intra prediction and inter prediction), and outputs the information related to prediction to the intra predictor 240 and the inter predictor 232. Specifically, the entropy code decoder 200 outputs identification information of an intra prediction mode to the intra predictor 240 and outputs information related to the inter prediction method and the motion vector to the inter predictor 232.

The inverse quantizer 211 and the inverse transformer 212 serve as an inverse quantizer/inverse transformer 210 configured to perform inverse quantization processing and inverse orthogonal transform processing in the unit of block.

The inverse quantizer 211 performs inverse quantization processing corresponding to the quantization processing performed by the quantizer 122 of the image encoding device 1. The inverse quantizer 211 restores the transform coefficients by performing, by using the quantization parameter (Qp) and the quantization matrix, inverse quantization of the quantized transform coefficients input from the entropy code decoder 200 and outputs the restored transform coefficients to the inverse transformer 212.

The inverse transformer 212 performs inverse orthogonal transform processing corresponding to the orthogonal transform processing performed by the transformer 121 of the image encoding device 1. The inverse transformer 212 restores the prediction residual by performing an inverse orthogonal transform of the transform coefficients input from the inverse quantizer 211 and outputs the restored prediction residual to the combiner 220.

The combiner 220 reconstructs (decodes) the original block by combining the prediction residual input from the inverse transformer 212 with a prediction image input from the switcher 233 in the unit of pixel and outputs the reconstruction block to the memory 231.

The memory 231 stores the reconstruction block input from the combiner 220. The memory 231 stores the reconstruction block in the unit of frame. The memory 231 outputs a reconstruction image (decoding image) in the unit of frame to the outside of the image decoding device 2.

The inter predictor 232 performs inter prediction that predicts a prediction target block by using, as a reference image, the reconstruction image (decoding image) stored in the unit of frame in the memory 161. The inter predictor 232 generates an inter-predicted image by performing the inter prediction in accordance with inter prediction information (such as motion vector information) input from the entropy code decoder 200 and outputs the inter-predicted image to the switcher 233.

The intra predictor 240 refers to the reconstruction block stored in the memory 231 and performs intra prediction in accordance with intra prediction information (identification information of an intra prediction mode) input from the entropy code decoder 200, thereby generating an intra-predicted image. The intra predictor 240 includes a mode specifier 241 configured to specify an intra prediction mode to be applied to the target block based on the identification information input from the entropy code decoder 200. The intra predictor 240 generates the intra-predicted image with reference to, among the reconstruction blocks (decoded blocks) stored in the memory 231, adjacent reference pixels determined in accordance with the intra prediction mode specified by the mode specifier 241. The intra predictor 240 outputs the intra-predicted image to the switcher 233.

The switcher 233 performs switching between the intra-predicted image input from the intra predictor 240 and the inter-predicted image input from the inter predictor 232 and outputs one of the prediction images to the combiner 220.

The code amount allocator 250 allocates a code amount to each of a plurality of intra prediction modes defined in advance. In addition, the code amount allocator 250 calculates a feature amount of a plurality of reference pixels adjacent to the target block of intra prediction and changes the manner of allocation of code amounts to a plurality of intra prediction modes defined in advance based on the calculated feature amount. Each reference pixel is part of a decoded block and thus is information that is identical on the image encoding device 1 side and the image decoding device 2 side. Details of the code amount allocator 250 will be described later.

The mode specifier 241 specifies an intra prediction mode to be applied to the target block based on the intra prediction information (identification information of the intra prediction mode) input from the entropy code decoder 200 and the code amounts allocated by the code amount allocator 250.

3. Configuration of Code Amount Allocator

Figure 4:
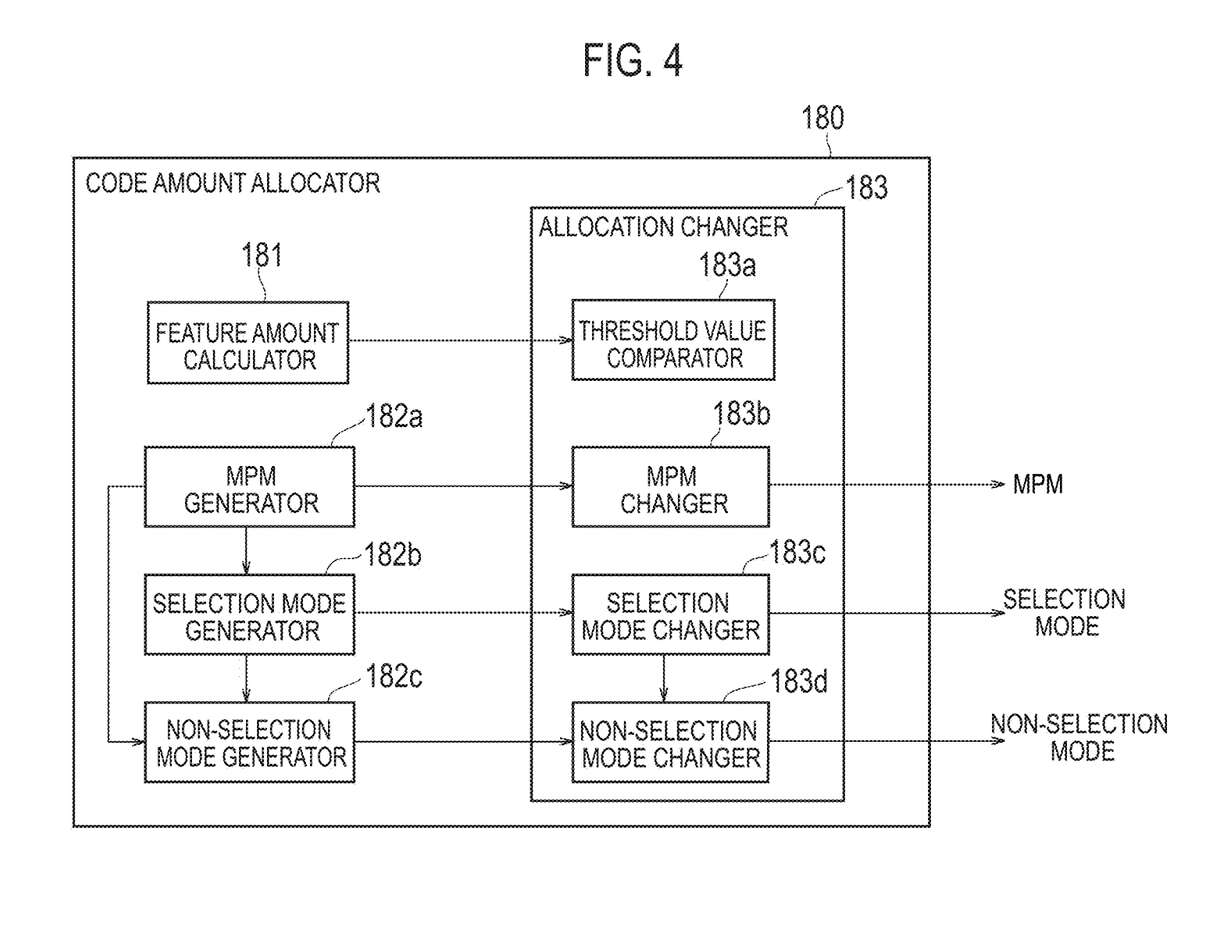
FIG. 4 is a diagram illustrating the configuration of a code amount allocator according to the embodiment.

FIG. 4 is a diagram illustrating the configuration of the code amount allocator 180 of the image encoding device 1 according to the present embodiment. The code amount allocator 250 of the image decoding device 2 has a configuration similar to that of the code amount allocator 180 of the image encoding device 1.

As illustrated in FIG. 4, the code amount allocator 180 includes a feature amount calculator 181, an MPM generator (first generator) 182a, a selection mode generator (second generator) 182b, a non-selection mode generator (third generator) 182c, and an allocation changer 183.

The feature amount calculator 181 receives the pixel values of a plurality of reference pixels adjacent to a target block of intra prediction from the intra predictor 240. The feature amount calculator 181 calculates, as a feature amount, the dispersion value or the average value of the pixel values of the plurality of reference pixels. In the present embodiment, the plurality of reference pixels include a plurality of reference pixel groups, and the feature amount calculator 181 calculates the feature amount of each of the plurality of reference pixel groups. The plurality of reference pixel groups include a left-side reference pixel group made of reference pixels on the left side of the target block and an upper-side reference pixel group made of reference pixels on the upper side of the target block. The left-side reference pixels may be further divided into a plurality of groups, and the upper-side reference pixels may be further divided into a plurality of groups. The following description will be made on an example in which the plurality of reference pixel groups are divided into two groups, namely the left-side reference pixel group and the upper-side reference pixel group. The feature amount calculator 181 outputs the feature amount calculated for each reference pixel group to the allocation changer 183.

The MPM generator 182a generates a plurality of MPMs (a plurality of first prediction modes) corresponding to intra prediction modes applied to peripheral blocks of the target block of intra prediction. In the present embodiment, the MPM generator 182a generates six MPMs of MPM0 to MPM5. Specifically, the MPM generator 182a provides priorities to the peripheral blocks of the target block of intra prediction and the intra prediction modes applied thereto and generates MPMs in a descending order of priority with MPM0 set to be an intra prediction mode (or peripheral block) at the highest priority and MPM5 set to be an intra prediction mode (or peripheral block) at the lowest priority. The MPM generator 182a outputs the generated MPMs to the selection mode generator 182b, the non-selection mode generator 182c, and the allocation changer 183.

The selection mode generator 182b generates a plurality of selection modes (second prediction modes) as some of intra prediction modes not included in the MPMs. In the present embodiment, the selection mode generator 182b generates 16 selection modes of selection mode 0 to selection mode 15. The selection mode generator 182b generates, as the selection modes, intra prediction modes selected at a predetermined interval in an ascending order (order from smallest to largest) or descending order (order from largest to smallest) of mode number from among intra prediction modes not included in the MPMs. The following description will be made on an example in which the selection mode generator 182b generates, as the selection modes, intra prediction modes selected at the interval of "4" in an ascending order of mode number from among intra prediction modes not included in the MPMs. The selection mode generator 182b outputs the generated selection modes to the non-selection mode generator 182c and the allocation changer 183.

The non-selection mode generator 182c generates, as a plurality of non-selection modes (third prediction modes), intra prediction modes selected in an ascending or descending order of mode number from among intra prediction modes not included in the MPMs nor the selection modes. In the present embodiment, the non-selection mode generator 182c generates 45 non-selection modes of non-selection mode 0 to non-selection mode 44. The non-selection modes are divided into a first-half group and a second-half group, and a longer bit length (code amount) is allocated to the second-half group than to the first-half group. The following description will be made on an example in which the non-selection mode generator 182c generates, as the non-selection modes, intra prediction modes selected in an ascending order of mode number from among intra prediction modes not included in the MPMs nor the selection modes. Thus, code amounts allocated to intra prediction modes (in other words, intra prediction modes in which the left-side reference pixels are mainly referred to) belonging to the group of small mode numbers are smaller than code amounts allocated to intra prediction modes (in other words, intra prediction modes in which the upper-side reference pixels are mainly referred to) belonging to the group of larger mode numbers. The non-selection mode generator 182c outputs the generated non-selection modes to the allocation changer 183.

Table 1 lists exemplary code amounts allocated to the MPMs, the selection modes, and the non-selection modes.

TABLE 1

| | MPM flag | Selection mode flag | Identification information (Bit string) |
|---|---|---|---|
| MPM 0 | 1 | N/A | 0 |
| MPM 1 | 1 | N/A | 10 |
| MPM 2 | 1 | N/A | 110 |
| MPM 3 | 1 | N/A | 1110 |
| MPM 4 | 1 | N/A | 11110 |
| MPM 5 | 1 | N/A | 11111 |
| Selection modes 0-15 | 0 | 1 | xxxx |
| Non-selection modes (First-half) | 0 | 0 | xxxxx |
| Non-selection modes (Second-half) | 0 | 0 | xxxxxx |

As indicated in Table 1, each intra prediction mode is expressed by a combination of an MPM flag, a selection mode flag, and identification information. The MPM flag indicates whether the corresponding intra prediction mode belongs to the MPMs. The selection mode flag indicates whether the corresponding intra prediction mode belongs to the selection modes. When the selection flag is "N/A" for an MPM, the MPM flag is followed by the first bit of the identification information.

The code amount of identification information allocated to an MPM is in the range of one bit to five bits. A smaller code amount of identification information is allocated to an MPM having a smaller number. The code amount of identification information allocated to a selection mode is four bits. The code amount of identification information allocated to a non-selection mode in the first-half group is five bits, and the code amount of identification information allocated to a non-selection mode in the second-half group is six bits.

As described above, the MPM generator 182a, the selection mode generator 182b, and the non-selection mode generator 182c each select intra prediction modes in accordance with a selection rule defined in advance, thereby determining a code amount to be allocated to each intra prediction mode. However, when a large code amount is allocated to an intra prediction mode that is likely to be selected by the mode selector 171, a too large code amount would be generated, which causes reduction of encoding efficiency.

Thus, in the present embodiment, the allocation changer 183 changes the manner of allocation of code amounts to intra prediction modes based on the feature amount of reference pixels used in intra prediction so that a small code amount is allocated to an intra prediction mode estimated to be likely to be selected by the mode selector 171. Accordingly, the generated code amount can be reduced to improve the encoding efficiency.

The allocation changer 183 changes the manner of allocation of code amounts to intra prediction modes based on the feature amount of each reference pixel group, which is input from the feature amount calculator 181. The allocation changer 183 includes a threshold value comparator 183a, an MPM changer (first changer) 183b, a selection mode changer (second changer) 183c, and a non-selection mode changer (third changer) 183d.

The threshold value comparator 183a compares the feature amount of each reference pixel group with one or more threshold values. In addition, the threshold value comparator 183a determines whether and how the manner of allocation of code amounts to intra prediction modes is changed in accordance with a result of the comparison of the feature amount of each reference pixel group with one or more threshold values. The following description will be made on an example in which the threshold value comparator 183a compares the feature amounts of the reference pixel groups (of the left-side reference pixels and the upper-side reference pixels) with two threshold values $T_{min}$ and $T_{Max}$. Each threshold value may be a constant or may be a value dependent on at least one element among the number, block size, and block shape of reference pixels of the corresponding group.

The MPM changer 183b changes the manner of allocation of code amounts to the MPMs input from the MPM generator 182a. In the present embodiment, the MPM changer 183b changes the manner of allocation of code amounts to the MPMs input from the MPM generator 182a by rearranging the order of the MPMs and outputs the MPMs subjected to the order rearrangement to the entropy encoder 130. However, when the manner of allocation of code amounts is not changed, the MPM changer 183b directly outputs the MPMs input from the MPM generator 182a.

The selection mode changer 183c changes the manner of allocation of code amounts to selection modes. The selection mode changer 183c changes the manner of allocation of code amounts by changing at least one of the interval (predetermined interval) at which intra prediction modes not included in the MPMs are included in selection modes and the range of mode number for selection as the selection modes, and outputs selection modes after the change to the non-selection mode changer 183d and the entropy encoder 130. However, when the manner of allocation of code amounts is not changed, the selection mode changer 183c directly outputs selection modes input from the selection mode generator 182b.

The non-selection mode changer 183d changes the manner of allocation of code amounts to non-selection modes. The non-selection mode changer 183d changes the manner of allocation of code amounts by changing the order of the mode numbers of intra prediction modes selected as non-selection modes from ascending order to descending order or from descending order to ascending order, and outputs non-selection modes after the change to the entropy encoder 130.

4. Exemplary Operation of Code Amount Allocator

Figure 5:
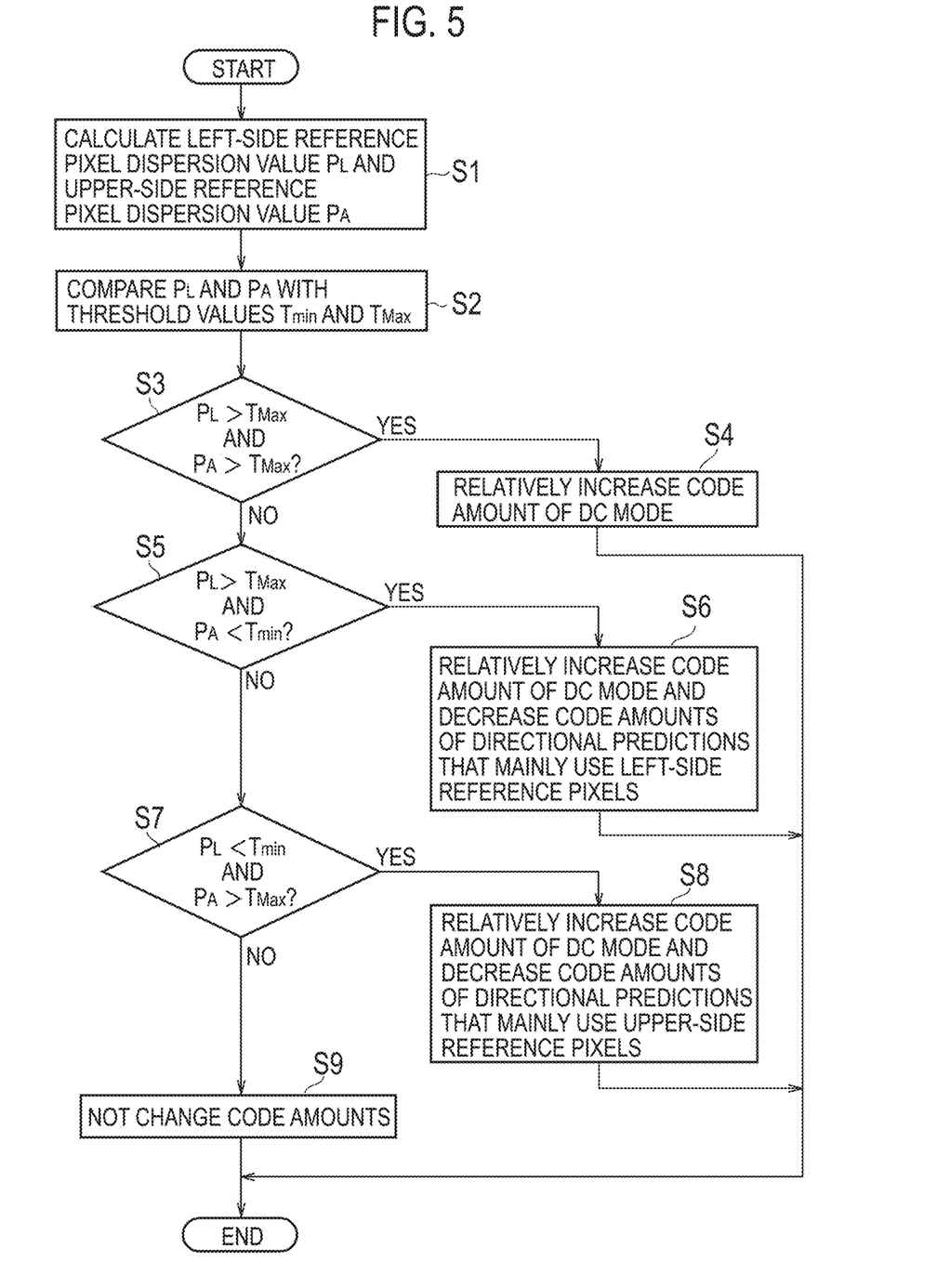
FIG. 5 is a diagram illustrating exemplary operation of the code amount allocator according to the embodiment.

FIG. 5 is a diagram illustrating exemplary operation of the code amount allocator 180 of the image encoding device 1 according to the present embodiment. The code amount allocator 250 of the image decoding device 2 performs operation similar to that of the code amount allocator 180 of the image encoding device 1.

As illustrated in FIG. 5, at step S1, the feature amount calculator 181 calculates a feature amount $P_L$ of the left-side reference pixels of a target block of intra prediction and a feature amount $P_A$ of the upper-side reference pixels of the target block. In the present exemplary operation, each feature amount is a dispersion value. The feature amount calculator 181 calculates each of a dispersion value $P_L$ of the left-side reference pixels and a dispersion value $P_A$ of the upper-side reference pixels by an expression below.

$$P = s^2 = \frac{1}{n}\sum_{i=1}^{n}(x_i - \bar{x})^2 \qquad \text{[Math. 1]}$$

Figure 6:
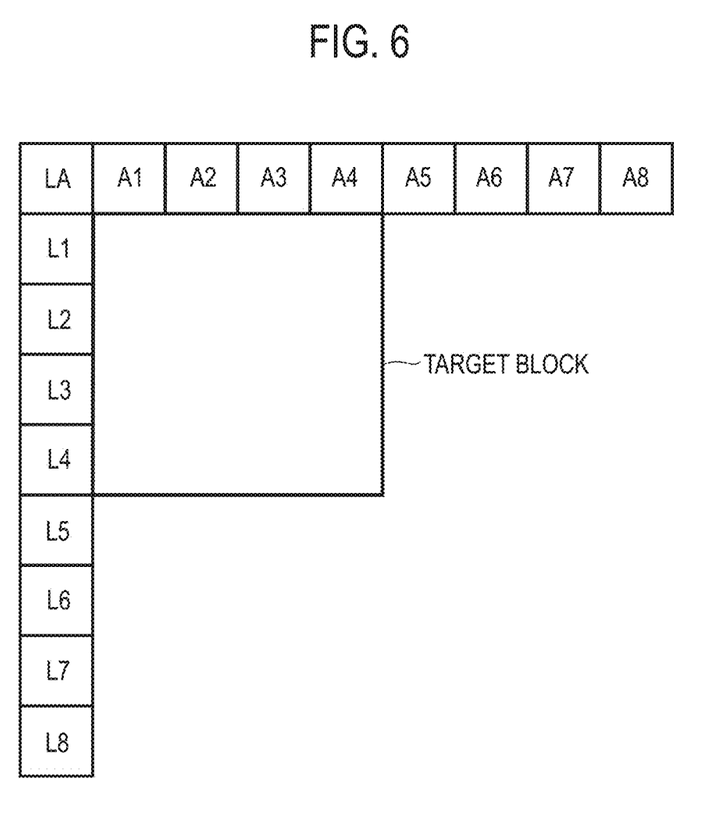
FIG. 6 is a diagram illustrating reference pixels used to calculate a feature amount according to the embodiment.

FIG. 6 is a diagram illustrating reference pixels used in feature amount calculation. In FIG. 6, the block size of a target block is 4×4. As illustrated in FIG. 6, the left-side reference pixels are four decoded pixels {L1, L2, L3, L4}, and the upper-side reference pixels are four decoded pixels {A1, A2, A3, A4}. Pixels L5 to L8 and pixels A5 to A8, which would be referred to in intra prediction, are yet to be decoded at intra prediction in some cases. In such a case, the pixel value of L4 is copied to pixels L5 to L8 and the pixel value of A4 is copied to pixels A5 to A8 so that the pixels can be referred to in intra prediction. Thus, pixels L5 to L8 and pixels A5 to A8 are not used in feature amount calculation.

At step S2, the threshold value comparator 183*a* compares the dispersion value $P_L$ of the left-side reference pixels and the dispersion value $P_A$ of the upper-side reference pixels with the threshold values $T_{min}$ and $T_{Max}$.

When the dispersion value $P_L$ and the dispersion value $P_A$ both exceed the threshold value $T_{Max}$ (YES at step S3), the MPM changer 183*b* rearranges the order of MPMs so that the code amount of a DC mode is relatively large at step S4. Specifically, when the dispersion value $P_L$ and the dispersion value $P_A$ both exceed the threshold value $T_{Max}$, the DC mode is estimated to be unlikely to be selected, and thus change is made so that the code amount of the DC mode is increased and the code amounts of the other intra prediction modes are decreased.

When the dispersion value $P_L$ exceeds the threshold value $T_{Max}$ and the dispersion value $P_A$ is smaller than the threshold value $T_{min}$ (YES at step S5), the MPM changer 183*b* rearranges the order of MPMs input from the MPM generator 182*a* so that the code amount of the DC mode is increased at step S6. In addition, the selection mode changer 183*c* and the non-selection mode changer 183*d* changes the manner of allocation of code amounts so that the code amounts of the directional predictions that mainly use the left-side reference pixels are decreased. Specifically, the directional predictions that mainly use the left-side reference pixels are estimated to be likely to be selected, and thus change is made so that the code amounts of the directional predictions that mainly use the left-side reference pixels are decreased and the code amounts of the directional predictions that mainly use the upper-side reference pixels are increased.

When the dispersion value $P_L$ is smaller than the threshold value $T_{min}$ and the dispersion value $P_A$ exceeds the threshold value $T_{Max}$ (YES at step S7), the MPM changer 183*b* rearranges the order of MPMs so that the code amount of the DC mode is increased at step S8. In addition, the selection mode changer 183*c* and the non-selection mode changer 183*d* change the manner of allocation of code amounts so that the code amounts of the directional predictions that mainly use the upper-side reference pixels are decreased. Specifically, the directional predictions that mainly use the upper-side reference pixels are estimated to be likely to be selected, and thus change is made so that the code amounts of the directional predictions that mainly use the upper-side reference pixels are decreased and the code amounts of the directional predictions that mainly use the left-side reference pixels are increased.

In a case of NO at steps S3, S5, and S7, the threshold value comparator 183*a* determines that the manner of allocation of code amounts is not to be changed at step S9.

5. Specific Examples

The operation illustrated in FIG. 5 will be described below with reference to specific examples.

5.1. Specific Example 1

Specific Example 1 is an example in which the dispersion value $P_L$ and the dispersion value $P_A$ both exceed the threshold value $T_{Max}$ (YES at step S3) and the left-side reference pixels and the upper-side reference pixels have pixel values as follows:

The left-side reference pixels {L1, L2, L3, L4}={200, 700, 800, 100}, the upper-side reference pixels {A1, A2, A3, A4}={800, 100, 200, 700}, and the threshold values {$T_{min}$, $T_{Max}$}={100, 10000}.

In this case, since $P_L=P_A=92500$ holds, the threshold value comparator 183*a* outputs a result: $P_L=P_A>T_{Max}$.

In this case, the MPM changer 183*b* rearranges the order of MPMs so that the code amount of the DC mode is relatively large. The MPMs include MPM initial values that are default fixed values, and MPMs that are variable based on intra prediction modes applied to peripheral blocks.

The MPM changer 183*b* changes the MPM initial values as follows:

(Before change) {planar mode, DC mode, VER mode, HOR mode, 2, 34}

(After change) {planar mode, VER mode, HOR mode, 2, 34, DC mode}

In this manner, the DC mode is MPM 1 before the change, but the DC mode is stepped down to MPM 5 after the change, and the code amount allocated to the DC mode is increased. Instead, the MPM numbers of the VER mode, the HOR mode, 2, and 34 are stepped up by one, and the code amounts allocated thereto are decreased.

The MPM changer 183*b* changes MPMs other than the initial values as follows:

(Before change) {left block, upper block, planar mode, DC mode, lower-left block, upper-right block, upper-left block}

(After change) { left block, upper block, planar mode, lower-left block, upper-right block, upper-left block, DC mode}

In this manner, the DC mode is MPM 3 before the change but the DC mode is stepped down to MPM 5 after the change. Instead, the MPM numbers of the lower-left block, the upper-right block, and the upper-left block are stepped up by one.

5.2. Specific Example 2

Specific Example 2 is an example in which the dispersion value $P_L$ is smaller than the threshold value $T_{min}$ and the dispersion value $P_A$ exceeds the threshold value $T_{Max}$ (YES at step S7) and the left-side reference pixels and the upper-side reference pixels have pixel values as follows:

{L1, L2, L3, L4}={510, 500, 490, 500},

{A1, A2, A3, A4}={500, 350, 300, 150}, and the threshold values {$T_{min}$, $T_{Max}$}={100, 10000}.

In this case, since $P_L=50$ and $P_A=15625$ hold, the threshold value comparator 183a outputs a result: $P_L<T_{min}$ and $P_A>T_{Max}$.

In this case, similarly to Specific Example 1, the MPM changer 183b rearranges the order of MPMs so that the code amount of the DC mode is increased.

In addition, the selection mode changer 183c changes the manner of allocation of code amounts as follows so that the code amounts of the directional predictions that mainly use the upper-side reference pixels are decreased.

(Before change) {2, 6, 10, 14, ... }: ascending order of mode number and interval of 4

(After change) {66, 64, 62, 60, ... }: descending order of mode number and interval of 2

In this manner, selection modes before the change include intra prediction modes selected at the interval of 4 in an ascending order of mode number, but selection modes after the change include intra prediction modes selected at the interval of 2 in a descending order of mode number.

Since the interval is halved through the change, the intra prediction modes in the range of the mode numbers "35" to "66" as the directional predictions that mainly use the upper-side reference pixels can be included in selection modes, but the intra prediction modes in the range of the mode numbers "2" to "33" as the directional predictions that mainly use the left-side reference pixels are not included in selection modes. As a result, the intra prediction modes in the range of the mode numbers "2" to "33" are included in non-selection modes having larger code amounts.

In addition, the non-selection mode changer 183d changes the manner of allocation of code amounts as follows so that the code amounts of the directional predictions that mainly use the upper-side reference pixels are decreased.

(Before change) five bits {3, 4, 5, 7, ... }, six bits { ... , 62, 63, 64, 65}: ascending order of mode number (After change) five bits {65, 63, 61, 59, ... }, six bits { ... , 7, 5, 4, 3}: descending order of mode number In this manner, intra prediction modes selected in an ascending order of mode number are included in non-selection modes before the change, but intra prediction modes selected in a descending order of mode number are included in selection modes after the change. The code amount of six bits is allocated to the intra prediction modes in the range of the mode numbers "35" to "66" as the directional predictions that mainly use the upper-side reference pixels before the change, but after the change, the code amount of five bits is allocated thereto, which is one bit smaller.

6. Other Embodiments

The embodiment describes above the example in which the selection mode generator 182b generates, as selection modes, intra prediction modes selected at a predetermined interval in an ascending order of mode number from among intra prediction modes not included in MPMs. However, the selection mode generator 182b may select intra prediction modes to be included in selection modes based on another selection criterion. For example, the selection mode generator 182b may determine intra prediction modes to be included in selection modes depending on the mode numbers of intra prediction modes included in MPMs. For example, the selection mode generator 182b may determine that intra prediction modes to be included in selection modes are those obtained by shifting the mode numbers of intra prediction modes included in MPMs by a predetermined value. In this case, the selection mode changer 183c may change the manner of allocation of code amounts through operation similar to that in the above-described embodiment.

A program configured to cause a computer to execute each processing performed by the image encoding device 1 and a program configured to cause a computer to execute each processing performed by the image decoding device 2 may be provided. Each program may be recorded in a computer readable medium. The computer readable medium can be used to install the program on a computer. The computer readable medium in which the program is recorded may be a non-transitory recording medium. The non-transitory recording medium is not particularly limited, but may be a recording medium such as a CD-ROM or a DVD-ROM. Alternatively, a circuit configured to execute each processing performed by the image encoding device 1 may be integrated to configure the image encoding device 1 as a semiconductor integrated circuit (chip set or SoC). Similarly, a circuit configured to execute each processing performed by the image decoding device 2 may be integrated to configure the image decoding device 2 as a semiconductor integrated circuit (chip set or SoC).

Although the embodiments are described above in detail with reference to the accompanying drawings, specific configurations are not limited to those described above but may be subjected to various designing changes and the like without departing from the scope of the invention.

The present application claims the benefit of Japanese Patent Application No. 2018-066711 (filed on Mar. 30, 2018), the entire contents of which are hereby incorporated by reference.

The invention claimed is:

1. An image encoding device for encoding blocks obtained by dividing an original image of a frame included in a video, the image encoding device comprising:
a most probable modes (MPM) generator circuitry configured to generate most probable modes including a plurality of intra prediction modes applied to peripheral blocks of a target block of intra prediction;
a feature amount calculator circuitry configured to calculate feature amounts of each of a plurality of reference pixel groups adjacent to the target block, wherein each of the plurality of reference pixel groups includes a plurality of reference pixel;
an allocation changer circuitry configured to rearrange an order of the most probable modes among the most probable modes by comparing each of the feature amounts of the plurality of reference pixel groups, and change allocation of code amounts to each of the most probable modes;
a mode selector circuitry configured to select an intra prediction mode to be applied to the target block; and
an encoder circuitry configured to encode identification information indicating the selected intra prediction mode in accordance with the allocated code amounts to the most probable modes.

2. An image decoding device for decoding blocks obtained by dividing an image of a frame included in a video, the image decoding device comprising:
a decoder circuitry configured to acquire identification information of an intra prediction mode by decoding encoded data generated by an image encoding device;
a most probable modes (MPM) generator circuitry configured to generate most probable modes including a plurality of intra prediction modes applied to peripheral blocks of a target block of intra prediction;

a feature amount calculator circuitry configured to calculate feature amounts of each of a plurality of reference pixel groups adjacent to the target block, wherein the plurality of reference pixel groups includes a plurality of reference pixel;

an allocation changer circuitry configured to rearrange an order of the most probable modes among the most probable modes by comparing each of the feature amounts of the plurality of reference pixel groups, and change allocation of code amounts to each of the most probable mode; and a mode specifier circuitry configured to specify the intra prediction mode based on the decoded identification information and the most probable modes.

3. An image decoding method for decoding blocks obtained by dividing an image of a frame included in a video, the image decoding method comprising:

acquiring identification information of an intra prediction mode by decoding encoded data generated by an image encoding device;

generating most probable modes including a plurality of intra prediction modes applied to peripheral blocks of a target block of intra prediction;

calculating feature amounts of each of a plurality of reference pixel groups adjacent to the target block, wherein the plurality of reference pixel groups includes a plurality of reference pixel;

rearranging an order of the most probable modes among the most probable modes by comparing each of the feature amounts of the plurality of reference pixel groups, and change allocation of code amounts to each of the most probable mode; and specifying the intra prediction mode based on the decoded identification information and the most probable modes.

* * * * *